(12) United States Patent
Holzbaur

(10) Patent No.: US 11,395,476 B2
(45) Date of Patent: Jul. 26, 2022

(54) ANIMAL FEED DISPENSER

(71) Applicant: Wingold GmbH, Wels (AT)

(72) Inventor: Petra Holzbaur, Klosterneuburg (AT)

(73) Assignee: Wingold GmbH, Wels (AT)

( * ) Notice: Subject to any disclaimer, the term of this patent is extended or adjusted under 35 U.S.C. 154(b) by 0 days.

(21) Appl. No.: 17/045,408

(22) PCT Filed: Oct. 22, 2018

(86) PCT No.: PCT/AT2018/060252
§ 371 (c)(1),
(2) Date: Oct. 5, 2020

(87) PCT Pub. No.: WO2019/191791
PCT Pub. Date: Oct. 10, 2019

(65) Prior Publication Data
US 2021/0144961 A1 May 20, 2021

(30) Foreign Application Priority Data
Apr. 6, 2018 (AT) ............................... A 50282/2018

(51) Int. Cl.
*A01K 5/00* (2006.01)
*A01K 5/02* (2006.01)

(52) U.S. Cl.
CPC .................................... *A01K 5/025* (2013.01)

(58) Field of Classification Search
CPC .......... A01K 5/0275; A01K 5/01; A01K 5/02; A01K 5/025; A01K 5/0114; A01K 5/0233;

(Continued)

(56) References Cited

U.S. PATENT DOCUMENTS

| 2006/0112898 A1 | 6/2006 | Fjelstad et al. |
| 2011/0005469 A1 | 1/2011 | Dean |
| 2014/0305373 A1* | 10/2014 | Trogdon ................ A01K 39/01 |
| | | 119/51.01 |

FOREIGN PATENT DOCUMENTS

| CN | 85107224 A | 7/1986 |
| CN | 102835325 A | 12/2012 |

(Continued)

OTHER PUBLICATIONS

Preliminary Report on Patentability of the International Searching Authority in English from corresponding Patent Cooperation Treaty (PCT) Application No. PCT/AT2018/060252, completed Mar. 16, 2020.

(Continued)

*Primary Examiner* — Joshua E Rodden
*Assistant Examiner* — Henry Hooper Mudd
(74) *Attorney, Agent, or Firm* — Gardner, Linn, Burkhart & Ondersma LLP

(57) ABSTRACT

An animal feed dispenser, in particular for horses, comprising a downwardly open, substantially vertically oriented tube with at least one filling opening for animal feed that is arranged in the upper portion of the tube. At least two elastic cables which project through in the interior transversely with respect to the longitudinal axis of the tube are arranged above one another, wherein a clearance remains above each cable and in each case allows only the reception of an individual portion unit of the animal feed, and wherein each cable is connected to an end of an associated pulling element which is guided outwardly substantially normal to the respective elastic cable via an opening in the tube wall, wherein a biting element is fastened to the end of the pulling element that is situated outside the tube.

19 Claims, 2 Drawing Sheets

(58) Field of Classification Search
CPC ...... A01K 5/0241; A01K 15/00; A01K 15/02; A01K 15/025; A01K 15/027
See application file for complete search history.

(56) References Cited

FOREIGN PATENT DOCUMENTS

| | | | |
|---|---|---|---|
| CN | 202907602 U | 5/2013 | |
| CN | 108477013 A | 9/2018 | |
| DE | 297 08 195 U1 * | 5/1997 | ............... A01K 5/01 |
| DE | 29708195 U1 | 7/1997 | |
| DE | 19735816 A1 | 3/1999 | |
| DE | 29821473 U1 | 4/1999 | |
| DE | 202006010218 U1 | 11/2006 | |
| DE | 202007002067 U1 | 6/2007 | |
| DE | 202008011742 U1 | 1/2009 | |
| WO | 2017192957 A1 | 11/2017 | |

OTHER PUBLICATIONS

International Search Report and Written Opinion of the International Searching Authority from corresponding Patent Cooperation Treaty (PCT) Application No. PCT/AT2018/060252, indicated completed on Jan. 18, 2019.
International Preliminary Examination Report from corresponding Patent Cooperation Treaty (PCT) Application No. PCT/AT2018/060252, dated Mar. 16, 2020.

* cited by examiner

ANIMAL FEED DISPENSER

CROSS-REFERENCE TO RELATED APPLICATION

The present application claims the priority benefits of International Patent Application No. PCT/AT2018/060252, filed Oct. 22, 2018, and claims benefit of A50282/2018, filed on Apr. 6, 2018.

BACKGROUND AND FIELD OF THE INVENTION

The invention relates to an animal feed dispenser, in particular for horses, comprising a substantially vertically oriented tube open towards the bottom having at least one filling opening for animal feed arranged in the upper section of the tube.

Items for occupying animals combined with an output of feed are generally known. While many of these devices for small animals are solely designed primarily with a certain training effect in mind, in those for horses the point is mainly to make the relatively long times the animals spend in boxes more tolerable. When spending relatively long times in boxes, horses tend to develop abnormal behaviour, such as for example weaving or crib-biting, which is caused by boredom. In order to prevent this behaviour, a series of devices have been developed which provide the horse with a means to occupy itself.

For example, US 2011005469 A describes a cylindrical apparatus that can be suspended in a loose box and has a number of recesses on the peripheral surface in which small items of food can be placed. A problem that occurs is that all the placed items of food or treats can be accessed by the horse at the same time, and there is thus no control as to how quickly the horse takes the individual items of food. The offered items of food, such as for example apples or even loose concentrated feed or cereal, provide the horse with increased motivation because these are treats for the horse. However, as it is similar in most cases for humans, these treats are only healthy in moderation, and accordingly should not be eaten in large amounts at once. For concentrated feed in particular, the crucial matter is not the amount per se but rather that it is mainly desirable if the horse takes the concentrated feed as slowly as possible. Only in this way can it be ensured that it is sufficiently well-insalivated and digested, whereby colic is prevented. However, if the apparatus, like the one in the above-mentioned document, does not have additional devices, there is no option to control the dispensing of the feed or the treats in the absence of the horse owner.

A further apparatus of this type is disclosed for example in DE 202007002067 U. In this case, a tube closed at the bottom and provided with lateral holes is pivotably attached to a wall. The tube can swing when hit by the horse and bulk feed can fall out of the lateral holes. Although not all the feed can be accessed at once, this apparatus is suitable only for bulk feed. Owing to the very simple design, the play effect for the horse is also low because it suffices for the horse to simply hit the tube and every individual action is immediately rewarded.

An apparatus which has been specifically developed for training dogs is disclosed—for example in DE 202008011742 U. The apparatus is a play tower in the form of a hollow tube having an opening in the lower peripheral region for delivering food. A plurality of separating stages are inserted within the tube that can be pulled out by the dog via straps on the outside. Individual items of food placed on the inside can be delivered sequentially. In case if only one item of food is inserted right at the top, the food can be released only after multiple actions by the animal. A disadvantage of this design is that if several items of food are inserted, these are then only sequentially delivered when the animal pulls out the stages in the correct sequence. However, if for example the upper stages are removed first and the lowermost stage is removed last, then all the items of food exit the delivery opening at the same time, which again leads to the undesired effect that the animal takes too many items of food at once.

SUMMARY OF THE INVENTION

The object of the present invention is to provide an animal feed dispenser that obviates the above-mentioned disadvantages. It should be permitted that several unit portions of solid feed or even of bulk feed are stored in the apparatus and can each be dispensed individually in a metered manner. The feed is delivered after the animal has occupied itself by playing with the dispenser, wherein not every individual action is to result in the delivery of feed, whereby, on the one hand, the animal retains interest and, on the other hand, the unit portions are delivered over a longer period of time.

This object is achieved by virtue of the fact that at least two elastic cables protruding through the interior of the tube transverse to the longitudinal axis of the tube are arranged one above the other. A free space remains above each cable and permits the reception of only one individual unit portion of the animal feed. Each cable is connected to one end of an associated pulling element, which extends to the outside substantially normal to the respective elastic cable via an opening in the tube wall. A biting element is fastened to the end of the pulling element located outside the tube. In the case of solid feed, a unit portion can be for example an apple. In the smallest design of the feed dispenser, which contains—when filled—two apples in the respectively provided free spaces, each held back by the elastic cables. However, in practice, the animal feed dispenser is sized to be larger and contains several elastic cables and free spaces arranged thereabove, such as four, five, six or seven. The more divisions, which are provided by elastic cables, the longer the animal can occupy itself with the device. The delivery of feed does not increase linearly with the number of actions of the animal because it becomes more and more difficult to release unit portions from divisions further up. If the animal pulls on a biting element, the elastic cable is moved to the side by the pulling element and thereby exposes a sufficient cross-section within the tube for a unit portion placed above the cable to be able to fall down. However, this only happens when the unit portion is the lowermost unit portion or the free space beneath the respective cable is free. If there is already a unit portion there, the next unit portion cannot slide down far enough and continues to be held by the elastic cable in the original free space when the pulling unit is released.

It is a further advantageous feature that the opening for the pulling element has a diameter which is smaller than the diameter of the elastic cable. As a result, even if the animal pulls very strongly on the pulling element, the elastic cable cannot be pulled into the opening and become trapped or damaged there. The functional reliability of the apparatus is thereby improved.

According to an additional advantageous feature, provision is made that viewing openings are provided in the tube wall that permit detection of the filling level in the respective free spaces above each of the elastic cables. This allows the animal handler to easily see which free spaces still contain feed portions, which facilitates re-filling. Either several small openings or windows can be provided in the tube wall, or even for example an elongate slot through which all the free spaces above the elastic cables can be seen.

According to an alternative embodiment of the invention, provision is made that a flexible hose extending in the longitudinal direction is arranged within the tube and, next to each elastic cable, an abutment element parallel thereto is arranged. The flexible hose extends between the elastic cables and the respective abutment elements and is pinched off therebetween in the initial position. By means of this embodiment, it is possible to also supply bulk feed, such as for example, concentrated feed mixtures, cereal or the like, in portions over a relatively long period of time using the feed dispenser. A unit portion of bulk feed can collect in the hose sections in the free spaces above the respective pinched-off section. The mode of operation for the animal remains the same. The animal pulls on the biting element and, as a result, the elastic cable is pulled away from the abutment element, whereby the pinched-off hose section is released and the feed can slide downwards. Also in this case, the feed can only slide further when the hose section located therebelow is not already completely filled with feed, or when it is the lowermost section that delivers the feed to the animal. In general, only a small amount of a unit portion is always released and can then enter the hose section located therebelow or be dispensed to the animal.

It is further an advantageous feature that an expanded reception space for a feed supply is connected to the upper end of the flexible hose. Depending upon the size of the apparatus, a corresponding supply container can be provided on the top. In the simplest case, the reception space is the uppermost expanded section of the flexible hose, which is fixed in the interior of the tube. However, a storage container, tapered in the shape of a funnel, can also be connected to the hose which then forms the corresponding reception space for the feed supply.

It is a further advantageous feature that the abutment element is formed by a rigid bolt or by an elastic cable. These variants have proved to be advantageous with respect to producing the feed dispenser in a simple and cost-effective manner.

Finally, it is an additional advantageous feature that a damping element consisting of an elastic food-safe material is allocated to each pulling element, wherein the damping element is arranged in the unloaded initial position between the biting element and the outer wall of the tube in the region of the pulling element. When the biting element is pulled and then released, it snaps back against the outer tube wall owing to the elastic cable within the tube. This produces noise and can result in more rapid wear on the tube wall and also on the biting element. The damping element is used as a shock absorber which minimises the noise and also the wear. In one possible design, the damping element can be for example a piece of an elastic hose which surrounds the pulling element and is thus used in the initial position as a spacer between the biting element and the tube.

BRIEF DESCRIPTION OF THE DRAWINGS

The invention will now be described in more detail with the aid of exemplified embodiments and with the aid of the attached figures.

DESCRIPTION OF THE PREFERRED EMBODIMENTS

Figure 1:
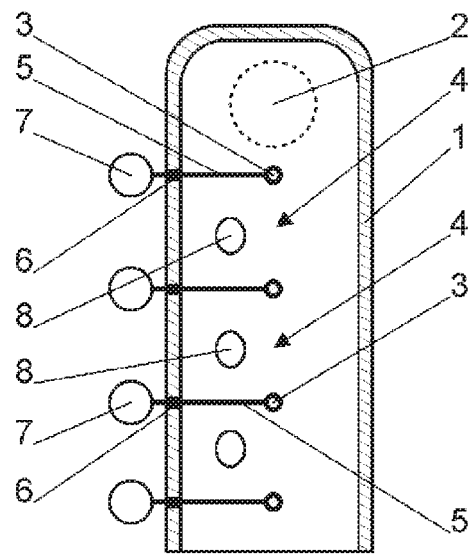
FIG. 1 shows a schematic longitudinal section through a first embodiment of the invention.

FIG. 1 schematically illustrates a first embodiment of a feed dispenser in accordance with the invention, which is provided for example for delivering apples. The feed dispenser includes an elongate tube 1 that is open towards the bottom. The tube can be produced from wood or another solid material, which is safe for an animal. Alternatively, the outer parts of the feed dispenser, or at least sections thereof, can also be produced from an edible material, such as for example a lick substance. A filling opening 2 is located at the upper end. The tube 1 is fastened vertically in the box, for example to the lattice bars by means of straps so that the biting elements 7 are facing the horse.

In the illustrated exemplified embodiment, the apparatus is one with a capacity to receive four apples. To fill the apparatus, one apple is pushed into the filling opening 2 and then the pulling elements 5 are pulled, via the biting elements 7, in order to pull the elastic cables 3 to the side and to convey the apple downwards. The free spaces 4 between the elastic cables 3 are of a precise height, such that there is space for only one apple. The position of the individual apples can be ascertained via the viewing openings 8, which facilitates the filling process. Depending upon the position of the viewing window, these can also permit easy access to the pulling elements 5 and the elastic cables 3, whereby the animal handler can insert or remove individual cables 3 and pulling elements 5 as required if he wishes to alter for example the portion sizes.

Figure 2:
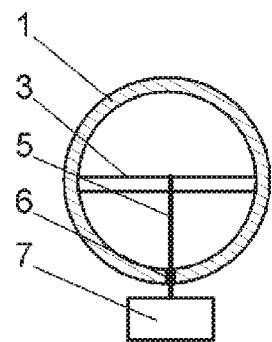
FIG. 2 shows a schematic cross-section through the embodiment of FIG. 1 in the initial position.
Figure 3:
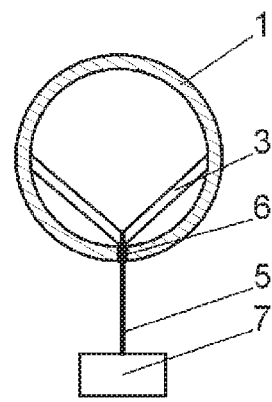
FIG. 3 shows a schematic cross-section through the embodiment of FIG. 1 with an actuated pulling element.

As soon as the animal begins to play with the apparatus, it will attempt to grip the biting elements 7 in its lips and teeth, and thus pulls the pulling elements 5 in an arbitrary sequence. The initial position of an elastic cable 3 is shown in FIG. 2. The elastic cable 3 protrudes centrally through the interior space of the tube 1, whereby the apple located thereabove cannot slide further down. If the animal now pulls the relevant biting element 7, the position according to FIG. 3 is achieved if the biting element is pulled out completely. Now there is enough space for the apple to be able to be moved further if an apple is not already present in the free space 4 located therebelow. Should the free space 4 be already occupied, then the apples become stacked one above the other and, when the pulling unit 5 is released, the elastic cable 3 returns to its initial position and thus firmly keeps the upper apple in its position.

In order to ensure that the apparatus is not damaged or to ensure that the elastic cable is not pulled into the opening 6 for the pulling element 5 and trapped there if the animal pulls too strongly on the biting element 7, provision is made that the opening 6 has a smaller diameter than the thickness of the elastic cable 3.

Figure 4:
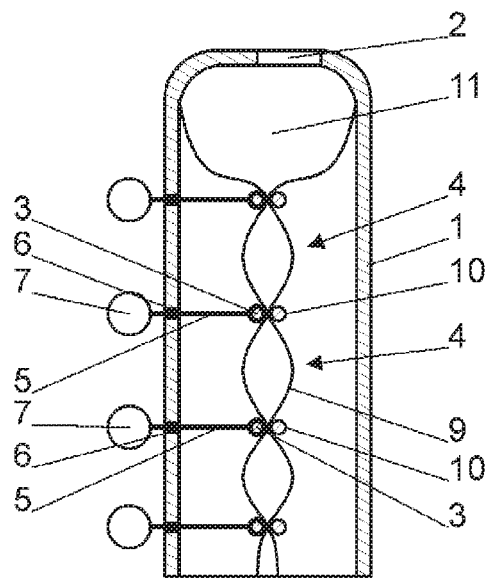
FIG. 4 shows a schematic longitudinal section through a second embodiment of the invention.
Figure 5:
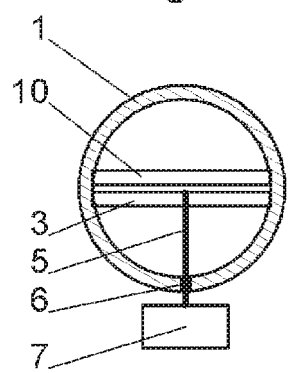
FIG. 5 shows a schematic cross-section through the embodiment of FIG. 4 in the initial position.
Figure 6:
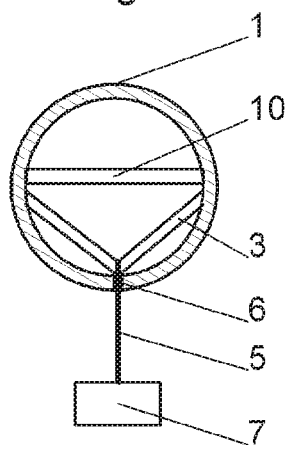
FIG. 6 shows a schematic cross-section through the embodiment of FIG. 4 with an actuated pulling element.

An alternative embodiment of a feed dispenser in accordance with the invention for bulk feed is illustrated in FIGS. 4-6. The tube 1, and the individual sections with elastic cables 3, free spaces 4, pulling elements 5 and biting elements 7 are configured identically to those in the embodiment illustrated in FIGS. 1-3. At the upper end of the tube 1, a flexible hose 9 is mounted on the inner wall of the tube 1. As a result, the filling opening 2 is also configured differently in order to permit simple filling from the top. The uppermost section of the flexible hose is somewhat expanded and forms a reception space 11 for a feed supply.

In addition to the elastic cables 3, abutment elements 10 are arranged parallel thereto. The flexible hose 9 extending in the interior of the tube 1 is thereby pinched-off in each case between the abutment elements 10 and the flexible cables 3 in individual sections. In the sections of the flexible hose 9 that are located in the free spaces 4, a unit portion of bulk feed can thus accumulate. By pulling on the pulling elements 5, these unit portions trickle downwards stage-by-stage.

As shown in cross-section in FIG. 5, the elastic cable 3 lies against the abutment element 10 in the initial position and the flexible hose 9 located therebetween is thus pinched-off. If the animal now pulls the pulling element 5, via the biting element 7, and thus pulls the elastic cable 3 to the side, as shown in FIG. 6, there is a passage opening for the bulk feed in order for the feed to trickle downwards, if there is space in the free space 4 therebelow.

The invention claimed is:

1. An animal feed dispenser, said animal feed dispenser comprising a substantially vertically oriented tube open towards a bottom and having at least one filling opening for animal feed arranged in an upper section of the tube, wherein at least two elastic cables protrude through an interior of the tube transverse to the longitudinal axis of the tube and are arranged one above the other, and wherein a free space remains above each cable and permits the reception of only one individual unit portion of the animal feed, and wherein each cable is connected to one end of an associated pulling element that extends to the outside substantially normal to the respective elastic cable via an opening in the tube wall, wherein a biting element is fastened to an end of the pulling element located outside the tube.

2. The animal feed dispenser as claimed in claim 1, wherein the opening for each pulling element has a diameter that is smaller than the diameter of the elastic cable.

3. The animal feed dispenser as claimed in claim 2, wherein viewing openings are provided in the tube wall that permit detection of the filling level in the respective free spaces above each of the elastic cables.

4. The animal feed dispenser as claimed in claim 3, wherein a flexible hose extending in the longitudinal direction is arranged within the tube and that, next to each elastic cable, an abutment element parallel thereto is arranged, wherein the flexible hose extends between the elastic cables and the respective abutment elements and is pinched off therebetween in an initial position.

5. The animal feed dispenser as claimed in claim 4, wherein an expanded reception space for a feed supply is connected to the upper end of the flexible hose.

6. The animal feed dispenser as claimed in claim 5, wherein each abutment element is formed by a rigid bolt or by an elastic cable.

7. The animal feed dispenser as claimed in claim 6, wherein a damping element consisting of an elastic material is allocated to each pulling element, wherein the damping element is arranged in an unloaded initial position between the biting element and an outer wall of the tube in the region of the pulling element.

8. The animal feed dispenser as claimed in claim 1, wherein viewing openings are provided in the tube wall that permit detection of the filling level in the respective free spaces above each of the elastic cables.

9. The animal feed dispenser as claimed in claim 1, wherein a flexible hose extending in the longitudinal direction is arranged within the tube and that, next to each elastic cable, an abutment element parallel thereto is arranged, wherein the flexible hose extends between the elastic cables and the respective abutment elements and is pinched off therebetween in an initial position.

10. The animal feed dispenser as claimed in claim 9, wherein an expanded reception space for a feed supply is connected to the upper end of the flexible hose.

11. The animal feed dispenser as claimed in claim 9, wherein each abutment element is formed by a rigid bolt or by an elastic cable.

12. The animal feed dispenser as claimed in claim 1, wherein a damping element consisting of an elastic material is allocated to each pulling element, wherein the damping element is arranged in an unloaded initial position between the biting element and an outer wall of the tube in the region of the pulling element.

13. A horse feed dispenser, said horse feed dispenser comprising a substantially vertically oriented tube open towards a bottom and having at least one filling opening for animal feed arranged in an upper section of the tube, wherein at least two elastic cables protrude through an interior of the tube transverse to the longitudinal axis of the tube and are arranged one above the other, and wherein a free space remains above each cable and permits the reception of only one individual unit portion of the animal feed, and wherein each cable is connected to one end of an associated pulling element that extends to the outside substantially normal to the respective elastic cable via an opening in the tube wall, wherein a biting element is fastened to an end of the pulling element located outside the tube.

14. The horse feed dispenser as claimed in claim 13, wherein the opening for each pulling element has a diameter that is smaller than the diameter of the elastic cable.

15. The horse feed dispenser as claimed in claim 13, wherein viewing openings are provided in the tube wall that permit detection of the filling level in the respective free spaces above each of the elastic cables.

16. The horse feed dispenser as claimed in claim 13, wherein a flexible hose extending in the longitudinal direction is arranged within the tube and that, next to each elastic cable, an abutment element parallel thereto is arranged, wherein the flexible hose extends between the elastic cables and the respective abutment elements and is pinched off therebetween in an initial position.

17. The horse feed dispenser as claimed in claim 16, wherein an expanded reception space for a feed supply is connected to the upper end of the flexible hose.

18. The horse feed dispenser as claimed in claim 16, wherein each abutment element is formed by a rigid bolt or by an elastic cable.

19. The horse feed dispenser as claimed in claim 13, wherein a damping element consisting of an elastic material is allocated to each pulling element, wherein the damping element is arranged in an unloaded initial position between the biting element and an outer wall of the tube in the region of the pulling element.

* * * * *